(12) United States Patent
O'Connell et al.

(10) Patent No.: US 8,624,967 B2
(45) Date of Patent: Jan. 7, 2014

(54) INTEGRATED PORTABLE IN-SITU MICROSCOPE

(76) Inventors: Dan O'Connell, Wailuku, HI (US);
Terry Born, Wailuku, HI (US)

(*) Notice: Subject to any disclaimer, the term of this patent is extended or adjusted under 35 U.S.C. 154(b) by 1325 days.

(21) Appl. No.: 11/907,828

(22) Filed: Oct. 17, 2007

(65) Prior Publication Data
US 2008/0204551 A1    Aug. 28, 2008

Related U.S. Application Data

(60) Provisional application No. 60/851,990, filed on Oct. 17, 2006.

(51) Int. Cl.
*H04N 9/47*     (2006.01)
*H04N 5/243*    (2006.01)
*H04N 7/18*     (2006.01)

(52) U.S. Cl.
USPC ............. 348/79; 348/80; 382/128; 382/276; 359/385; 359/386; 359/388; 359/389; 359/390

(58) Field of Classification Search
USPC ........ 348/79, 80; 382/128, 276; 359/385–390
See application file for complete search history.

(56) References Cited

U.S. PATENT DOCUMENTS

| | | | |
|---|---|---|---|
| 4,095,874 A | 6/1978 | Wallace | |
| 4,729,635 A | 3/1988 | Saferstein | |
| 4,737,016 A | 4/1988 | Russell et al. | |
| 5,267,087 A | 11/1993 | Weidemann | |
| 5,572,370 A | 11/1996 | Cho | |
| 5,844,714 A | 12/1998 | DiResta | |
| 5,852,498 A | 12/1998 | Youvan et al. | |
| 5,880,879 A | 3/1999 | Foo | |
| 6,847,480 B2 | 1/2005 | Steenblik et al. | |
| 6,859,312 B1* | 2/2005 | Atchison | 359/380 |
| 6,967,335 B1* | 11/2005 | Dyer et al. | 250/442.11 |
| 7,072,103 B1* | 7/2006 | Atchison | 359/384 |
| 7,394,979 B2* | 7/2008 | Luther et al. | 396/432 |
| 2003/0142302 A1* | 7/2003 | Jiang | 356/301 |
| 2004/0136190 A1 | 7/2004 | Christoph | |
| 2004/0190129 A1* | 9/2004 | Peter et al. | 359/368 |
| 2005/0063058 A1* | 3/2005 | Langley | 359/510 |
| 2005/0111088 A1* | 5/2005 | Winterot et al. | 359/368 |
| 2005/0168808 A1* | 8/2005 | Ishiwata | 359/368 |
| 2005/0259437 A1 | 11/2005 | Klein et al. | |
| 2006/0077536 A1* | 4/2006 | Bromage et al. | 359/368 |
| 2006/0092503 A1* | 5/2006 | Saunders | 359/368 |
| 2006/0217597 A1* | 9/2006 | Vayser et al. | 600/249 |
| 2007/0081078 A1* | 4/2007 | Cummings et al. | 348/79 |
| 2009/0034063 A1* | 2/2009 | Yamazaki et al. | 359/387 |

* cited by examiner

*Primary Examiner* — Haresh N Patel
(74) *Attorney, Agent, or Firm* — Morgan Lewis & Bockius LLP (57) ABSTRACT

A hand-held microscope includes a rigid tripod stand with adjustable legs, a visual display component, an imaging detector and an optical assembly comprising an imaging lens and an objective lens housed within an imaging tube. Multiple illumination sources can be used in the microscope, including LED or laser diode sources. The microscope can also include interchangeable imaging tubes that enable bright field, dark field, fluorescence and other imaging modalities.

24 Claims, 5 Drawing Sheets

INTEGRATED PORTABLE IN-SITU MICROSCOPE

The present invention claims the benefit of U.S. Provisional Application No. 60/851,990, filed on Oct. 17, 2006, which is hereby incorporated by reference in its entirety.

BACKGROUND OF THE INVENTION

1. Field of the Invention

The present invention relates to a miniature high precision portable microscope, and more particularly to a self contained microscope that is built into a miniature portable stand.

2. Description of Related Art

High precision laboratory microscopes are bulky, heavy and occupy a large area on a bench. These medium to high power microscopes are traditionally limited to sample observations on a rigid table in a laboratory. Unfortunately, these instruments are not practical for every application or accessible to every person who can benefit from them. There are a number of inexpensive portable microscope devices available on the market. However, these technologies are low power and limited to demonstration and instructional purposes only. They have limited magnification and resolution and often use plastic optics. For example, the PocketScope®, manufactured by Pocketscope.com LLC of Alpharetta, Ga., utilizes a single plastic lens and is limited to 150× magnification and the QX3 microscope is limited to 200×.

U.S. Pat. No. 4,729,635 is directed to a hand-held single lens microscope incorporating two members movable towards and away from each other for focusing. One member holds a specimen to be examined, while the other member has a lens aperture, presumably one with lens beads. The specimen is brought into focus by pivoting one clamp component about the center of the other clamp component with finger pressure, thereby adjusting the distance between the lens and the slide.

U.S. Pat. No. 4,095,874 discloses a hand-held single lens microscope which utilizes finger pressure to accomplish focusing by deflection of one cantilevered part bearing the spherical lens and a second cantilevered part holding the slide. The two parts are resiliently joined along a common edge and partially enclose the slide when the unit is in use. The slide, however, cannot be repositioned while it is being viewed.

U.S. Pat. Nos. 4,737,016 and 5,844,714 disclose portable microscopes, incorporating low magnifying power lenses in a handle combined with various detachable devices for holding both unmounted specimens and standard microscope slides. The image is focused by pivoting or sliding the specimen holding means closer or further from the lens. These microscopes lack aperture optimization, a precise and stable focus mechanism, adequate illumination, and an aperture for illumination collimation control.

U.S. Pat. Nos. 5,572,370 and 5,267,087 disclose simple, low magnification microscopes intended for use in determining a woman's fertile periods. These instruments are not intended for use with standard specimen slides, nor are they intended for general microscopic use. The overall form of these microscopes is cylindrical and internal illumination is provided by means of battery powered light sources. There is no provision to utilize ambient light for specimen illumination. These microscopes lack aperture optimization, a precise and stable focus device or mechanism, and adequate illumination.

U.S. Pat. No. 5,880,879 discloses a microscope objective lens system utilizing a diffractive optical element for chromatic aberration correction. The two lens system includes an aperture stop in between the lenses. One example of a lens designed for microscopes according to this invention is a singlet lens incorporating both aspheric and diffractive surfaces.

U.S. Pat. No. 6,847,480 discloses a portable, single lens microscope for viewing an object positioned on a slide. This microscope uses only a single lens, and the specimen must be presented on a microscope slide.

There is a need for a high resolution, high magnification, compact and portable, self-contained microscope for field use, military applications, hospital or clinical use. Conventional laboratory microscopes require the sample to be sectioned, extracted or cut into small pieces to fit on a microscope slide or other substrates within the confines of a microscope stage. For many applications it is impractical to extract a small sample that can be mounted and observed using today's bench-top microscopes. Therefore there is also a need for a high-precision scientific grade portable microscope, suitable for scientific or military applications, which is capable of observing virtually any specimen with little or no alteration to the sample.

SUMMARY

Accordingly, the present invention is directed to a miniature, high precision, portable hand-held microscope that substantially obviates one or more of the problems due to the limitations and disadvantages of the related art.

An object of the invention relates to a hand-held microscope including a tripod stand with adjustable legs which is affixed to a positioning stage; a visual display component affixed to the positioning stage; an imaging detector component electrically connected to the visual display; and an optical assembly including an imaging lens and an objective lens. Both the imaging lens and objective lens are housed within an imaging tube having two ends, one end of which is affixed to the positioning stage and oriented transverse thereto, and the other end of which is directed toward a sample to be viewed.

In another embodiment, the hand-held microscope further includes at least one illumination source.

In yet another embodiment, the objective lens has a magnification of from 10× to 100×. The imaging lens can have a magnification of from 2× to 10×. The compound magnification of the imaging and objective lens can be greater than 500×.

In another embodiment, the hand-held microscope further includes an imaging detector, an imaging lens, a beam splitter/recombination optic, an interchangeable objective lens, a specimen surface/sample holder, a selectable light source, a light source collimating lens, an iris diaphragm, and a filter.

Additional features and advantages of the invention will be set forth in the description which follows, and will be apparent, in part, from the description, or may be learned by practice of the invention. The objectives and other advantages of the invention will be realized and attained by the structure particularly pointed out in the written description and claims hereof, as well as the appended drawings.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incor

The base plate has sockets for the tripod stand to attach to. The central portion of the base plate contains a cutout slot for holding standard microscope slides or other sample substrates. The bottom of the base plate incorporates a light source pad for illuminating the sample in transmission.

DETAILED DESCRIPTION OF THE INVENTION

The present invention is directed to a high precision, self-contained portable microscope capable of use in advanced scientific microscope applications. This miniature digital microscope camera (or MICAM) innovation (see FIG. 1) is capable of state-of-the-art microscope techniques, including, but not limited to, "bright field," "dark field," "phase contrast," "fluorescence imaging" and "polarization imaging."

The MICAM technology consists of a durable, hand-held, scientific quality microscope and stand that is not limited to instructional or demonstration purposes. MICAM utilizes high-quality optics suitable for obtaining high resolution, high magnification scientific photomicrographs in the field. MICAM is a compact, portable microscope that can be used to observe virtually any sample that otherwise would not be observable or convenient using conventional bench-top microscopes. Samples may include live cells, other biological samples, bacteria, viruses, blood, toxins, minerals, rocks, semiconductors, metals, ceramics, and virtually any specimen that can be observed in-situ without the need to return to the laboratory for analysis. This technology development has capabilities in military, field research, zoology, archeology, mineralogy, forensics and many other applications.

Figure 1:
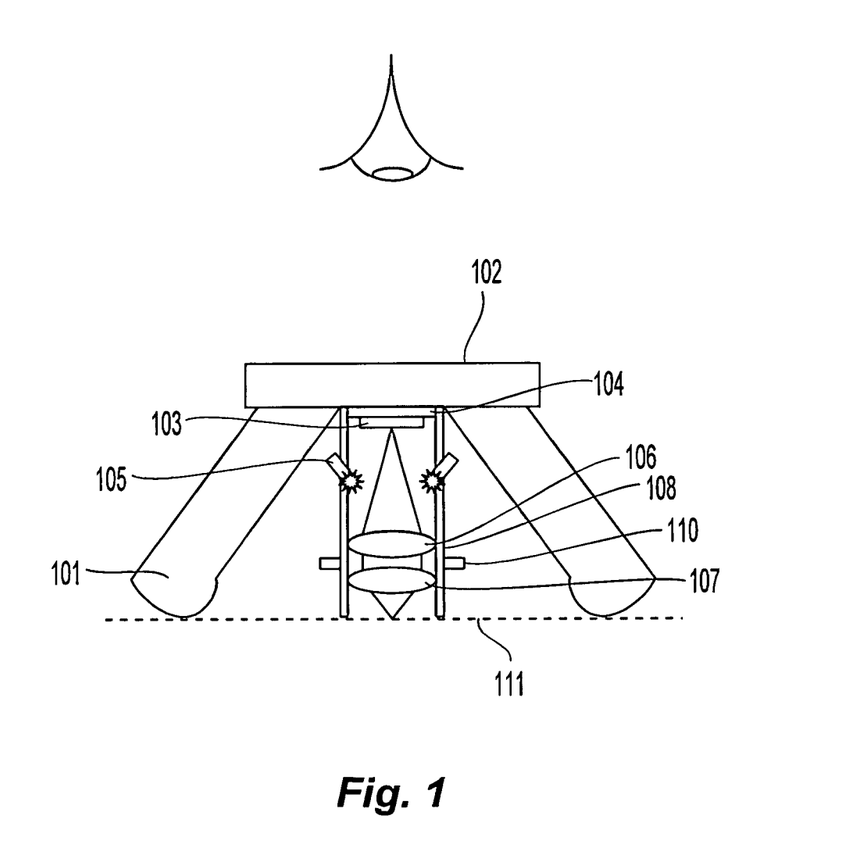
- FIG. 1 is a conceptual diagram of a MICAM instrument comprising a miniature self-contained microscope and adjustable tripod stand.

The MICAM invention is a portable, self-contained, medium to high power microscope without the requirement for a computer to control the instrument or acquire images from the camera. As seen in FIG. 1, the MICAM system comprises a small rigid tripod stand 101 with a built-in microscope objective lens 107, a positioning stage 104, an imaging detector 103 (including, but not limited to, a Charged Couple Device (CCD) or Complementary Metal Oxide Semiconductor (CMOS) imaging detector) and a visual display 102 including, but not limited to, a Liquid Crystal Display (LCD) mounted on top of the tripod stand and facing upward for the observer to view samples directly on the LCD screen in real-time. The tripod 101 stand can be placed over any surface, while the sample is viewed directly on the LCD screen 102 without further adjustments. The microscope objective lens 107 is threaded into a housing which can be removed such that a wide range of magnifications or Numerical Aperture (NA) microscope objectives, including Long Working Distance (LWD) objectives, can be used, ranging in magnification from 10× to 100×. A set of imaging lenses 106 are interchangeable ranging from 2× to 10×. Both the imaging lens and the objective lens are housed within enclosure sleeve (or imaging tube) 108. The lenses can be focused with focus adjustments 110. Combined with the imaging lens or detector lens, compound magnifications of 500× or greater are achievable.

The rigid tripod stand 101 in FIG. 1 includes adjustable legs and is attached to multiple axis micro-positioning stage 104. Built-in, interchangeable, oblique illumination light sources 105 provide illumination to the specimen, which can be viewed from 111, which is a sample surface or optional base plate with a microscope slide slot.

Figure 2:
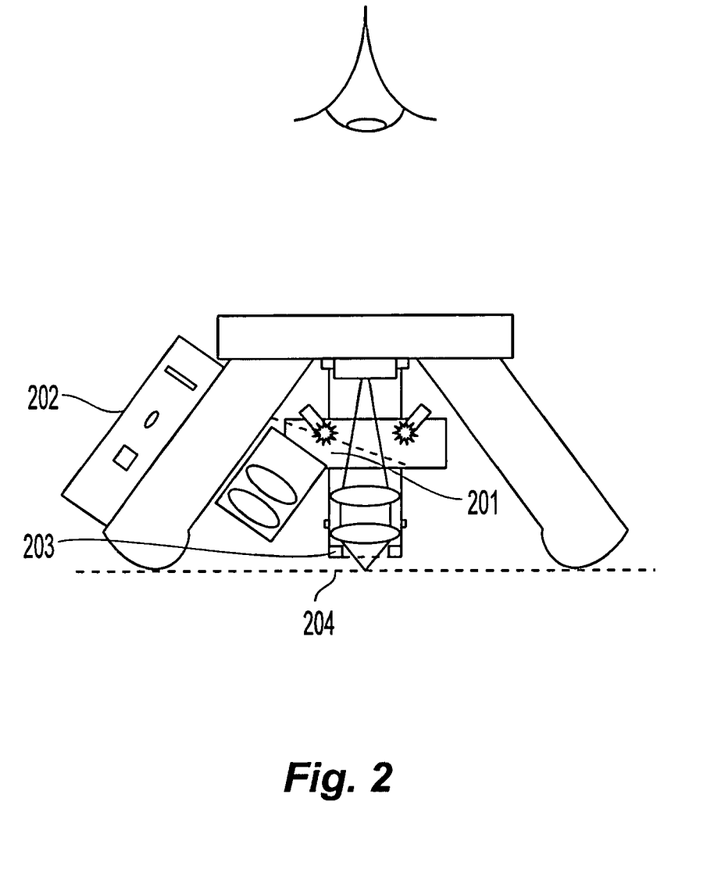
FIG. 2 is a conceptual diagram of a MICAM instrument showing multiple microscope objective lenses mounted in a selectable turret. An electronics module performs all necessary electronic and power functions making it completely self contained, which is ideal for field use.
Figure 3A:
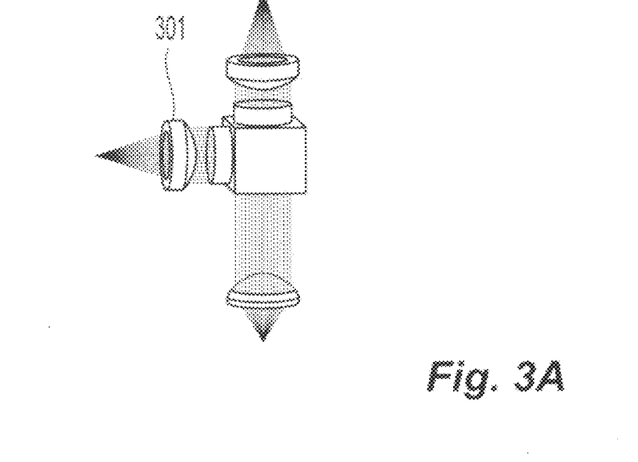
FIGS. 3a and 3b show an imaging housing attachment that performs a range of high precision scientific microscopy techniques such as fluorescence imaging, bright field or dark field imaging.
Figure 3B:
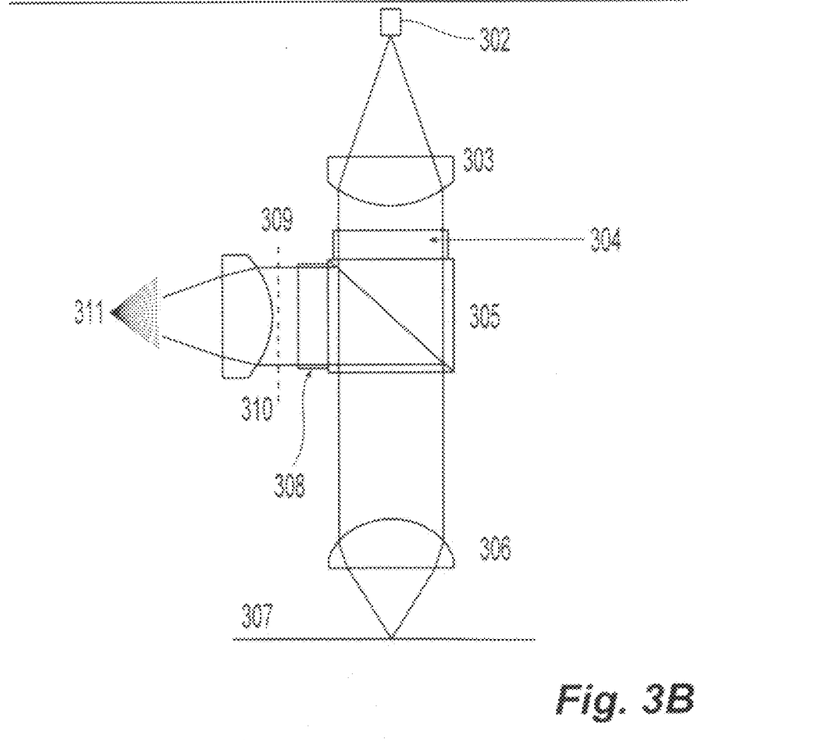

FIGS. 2 and 3 show other embodiments of the invention, wherein the fixed objective lens can be unthreaded from the imaging tube 203 and replaced with a variety of NA objectives to change the magnification. However, in an alternate configuration, the fixed microscope objective lens can be replaced with an objective lens turret that holds multiple microscope objectives that can be rotated into place to accommodate a variety of magnifications (FIG. 2). Microscope objective turret 201 holds multiple objective lenses that can be rotated into place to view specimen or sample surface 204, which could be, e.g., a plant, tree, rock, propeller blade, or any surface under analysis. Electronics module 202 controls the camera and light source settings as well as other electronic controls, including memory storage.

In other embodiments, the invention includes an interchangeable imaging housing 301 with a variety of imaging modules to enable many high performance microscope techniques to be implemented in the field or in-situ (See FIG. 3a). Imaging modules include, but are not limited to, dark field, bright field, phase contrast and fluorescence imaging. As shown in FIG. 3b, each imaging module comprises a miniature optical assembly comprising detector or imaging sensor 302, imaging lens 303, filter 304 (e.g., bandpass filter, fluorescence emission filter, or neutral density filter), beam splitter/recombination optic 305 (e.g., wavelength division (dichroic) or amplitude splitter, bright field or dark field), interchangeable objective lens 306, specimen surface or sample holder 307, selectable light source 311, light source collimating lens 310, iris diaphragm 309, and filter 308 (e.g., bandpass filter, fluorescence excitation filter). This configuration provides maximum efficiency illumination on-axis.

In the above embodiment, the imaging tube is threaded at its imaging end and attaches to a mating threaded flange that houses a camera which is attached to the tripod.

Sample illumination is provided by internal light sources including, but not limited to, Light Emitting Diodes (LEDs), Laser Diodes (LDs), white light, narrow band or Ultra-violet (UV) LEDs, mercury, xenon lamp or other miniature lamps. Accessory light modules are interchangeable, allowing a wide range of illumination techniques.

Four alternative illumination techniques are built into the MICAM instrument and available to the user. An illumination collar attaches to the outside of the imaging tube. The illumination collar comprises a ring of alternating color LED lamps (or other light sources described later) located along the imaging tube. Each LED lamp is inserted into a sleeve that is mounted at an angle to the imaging tube providing oblique illumination. The sleeve serves as a light baffle to block light from directly reaching the imaging detector. These LED lamps are encapsulated inside a plastic lens which concentrates the light along a narrow cone. A ring of lamps form a diffuse illumination of the sample. Reflected or scattered light from the sample is collected by the microscope objective and imaged onto the imaging detector.

The second illumination method consists of a ring of surface mounted LED chips alternating in color, ultra-violet, blue, green, red, white light around a ring. The LED ring is attached to the specimen end of the imaging tube located just outside the clear aperture of the microscope objectives. Electrical connections are made at the edge of the illuminator ring along the imaging tube which eliminates any external wires. The LED ring provides oblique illumination of the sample. The LED ring is a tilted surface such that the emitting surface of the LED's is in the direction of the sample. Using the electronics control module, any one color or multiple colors can be selected such that a complete ring of a particular color will illuminate the sample such as but not limited to UV, blue, green, red or white light. The surface mounted LED chips can be used with or without focusing optics. The close proximity with the sample and broad emission pattern of the surface mounted LED ring produces a uniform diffuse illumination of the sample.

The third method of illumination utilizes a light source mounted inside a tube that incorporates epi-illumination imaging (see FIG. 3) and comprises a choice of beam splitter cubes for fluorescence, bright field or dark field imaging. This maximizes the efficiency of the light source and concentrates the light onto the sample that is concurrently imaged onto the image sensor.

Figure 5:
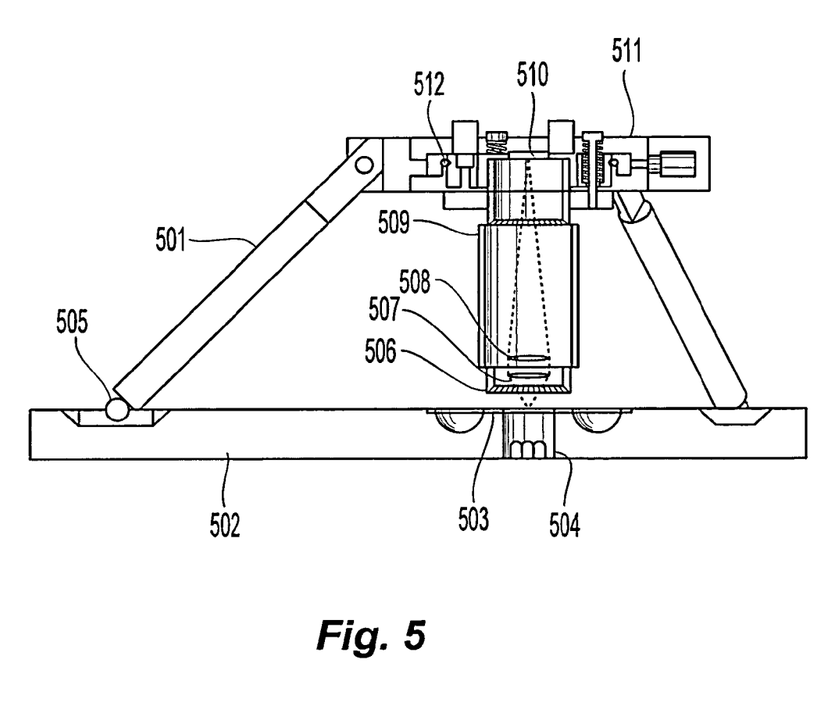
FIG. 5 shows accessory modules for a MICAM microscope instrument mounted to an optional base plate.

The fourth illumination method provides transmitted illumination through a sample. As shown in FIG. 5, the tripod stand is manufactured with an optional base plate 502 on which to rest the tripod. The base plate 502 contains sockets 505 for the tripod feet to register against for repeatable attachment and lock in place. The center of the base plate contains a slot 503 for mounting samples such as standard microscope slides or other substrates. Mounted underneath the sample slot is illumination disk 504, recessed below the top surface of the base plate. The illumination disk or pad 504 is a two-dimensional array of alternating color LED's that transmits light through the sample which is then imaged onto the imaging detector. A single color, multiple color or white light illumination is provided. The array of LED lamps provides uniform illumination of the sample in transmission.

Alternatively the LED pad can be replaced with a small LCD screen which can be used as a single color or white light source to illuminate the sample in transmission.

The imaging and illumination tube is threaded to a multi-dimensional micro-translation stage for lateral positioning of the microscope objective relative to the sample under analysis. The multi-dimensional translation stage can take the form of either 2-dimension or 3-dimensional positioning stage. The 3-dimensional stage incorporates a third axis for focus adjustment. Micrometer adjusters are used to control the lateral position of the miniature slide. In an alternate configuration the translation stage consists of miniature hydraulic actuators that move each axis along a miniature slide (see FIG. 5). This innovation provides a precise control of lateral positioning as well as focus without disturbing the instrument or sample. Each axis is controlled with a miniature hydraulic adjustment knob or slider located on the electronics module An imaging detector 510 is built into the base of the imaging tube 509. The imaging detector consists of, a CCD, CMOS or any other type of imaging sensor.

The MICAM system does not require an external camera or monitor to view a sample. An LCD viewing screen is built into to the top of the MICAM tripod stand 511 for direct viewing by an observer without the need for an eyepiece. The LCD screen replaces the bulky awkward eyepiece module. The sample under analysis can be observed directly in real-time comfortably by viewing the display screen. The LCD display can be removed from the MICAM instrument as well as the electronics module. The LCD display attaches to the electronics module and can be held by the user similar to a video game controller. Alternatively, the LCD display and electronics module combination can be set on a nearby surface with a stand that is provided.

When the LCD display is removed from the MICAM instrument, samples can be set on the top surface of the tripod stand. The imaging tube can be removed and reversed or flipped such that the microscope objective is facing upward to view the sample located on top of the stand. This provides additional flexibility in viewing samples that might contain specimens at the bottom of a liquid cuvette or petri dish. The translation mechanism is built into the tripod stand and independent of the imaging tube which enables the imaging tube to be attached in either orientation.

The MICAM tripod can be placed on virtually any surface to acquire high magnification photomicrographs. A wide variety of illumination sources are built into the microscope and no external light sources are required. Other available portable microscopes are limited to demonstration purposes and limited to 150× to 250× magnification. The portable microscope of the present invention, on the other hand, can have magnification greater than 500×.

The tripod stand can also take the form of a compact cylinder with an electrical umbilical cord connecting the display screen and microscope imaging sensor and light sources. The tripod stand is adjustable to rest on many surfaces. The legs of the tripod are collapsible into a very compact cylinder for storage, carrying in a case or transporting.

The MICAM system is completely self-contained and portable. No USB cable is necessary and no other computer interface is required. Digital images or micrographs can be stored directly onto a memory stick or other portable memory device, similar in nature to digital camera image storage.

Figure 4:
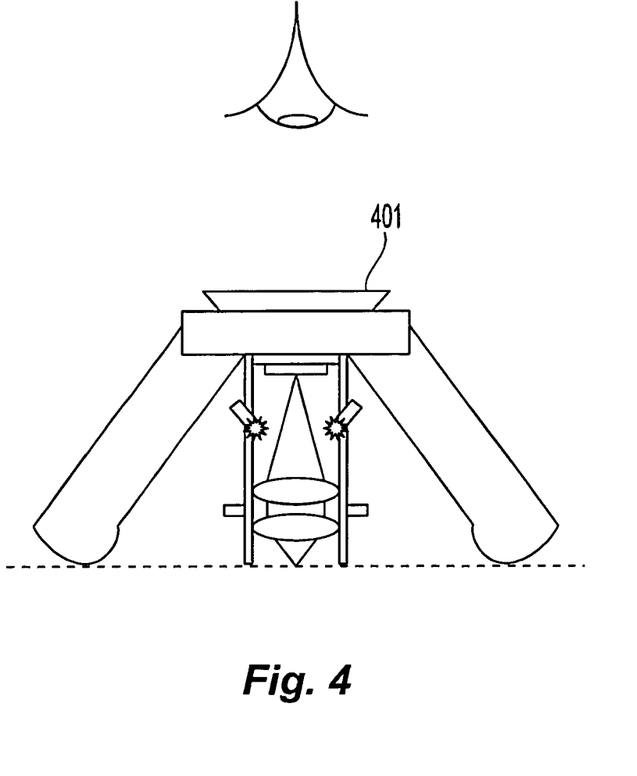
FIG. 4 shows an accessory fused fiber taper for direct viewing of the sample without the need for an imaging camera. The fiber taper array is a low cost alternative accessory that is interchangeable with the imaging sensor and LCD viewing screen.

As seen in FIG. 4, the MICAM combination camera and LCD display can be removed and replaced with a 2× (or any other magnification) fused fiber taper array 401, providing a lower cost viewing screen option for additional applications. The fused fiber bundle taper 401 consists of a densely packed array or bundle of fibers that are fused together with very compact spacing of in-tact fiber optics. The fiber taper is heated and drawn apart creating a narrow section in the middle near the heat source. The drawing process forms a taper in the fiber bundle which is then cut in half producing two identical fiber tapers. When an image is formed on the narrow face of the fiber taper a magnified version of the image can be observed on the larger face of the fused fiber taper. (In one embodiment, the fiber taper array used was from Schott Glass, Elmsford, N.Y.) When the camera is removed, the input face of the fiber taper is placed in the same image plane as the image sensor. The fiber taper transfers the image formed by the microscope objective from the input face to the output face of the fiber optic taper. The output face of the fiber taper is twice as large as the input face (or any other magnification taper ratio) providing additional magnification and direct visual observations. The sample can be viewed directly with the unaided eye of an observer on the output face of the fiber taper which provides an observation screen.

Another innovation of the MICAM technology is the use in certain embodiments of multiple multi-color LED or LD light sources with multiple illumination techniques built-in. The MICAM technology incorporates multiple light sources (LED's or LD's) built into a central imaging sleeve that covers the image sensor and microscope objective and is directed onto the sample for uniform illumination of the sample surface (see FIG. 2). Alternate illumination is achieved through beam combining optics within the imaging tube (FIG. 3). An illumination ring can be attached to the specimen end of the microscope imaging sleeve for oblique close proximity illumination. Lastly, transmitted illumination is incorporated into an accessory base plate. A light source controller allows the user to select from the variety of built-in light sources as well as to control the color and brightness of the light sources. The lamp brightness is adjustable using a lamp controller built into an embedded electronic controller.

The MICAM innovation provides a compact hand-held microscope that can be placed over virtually any sample for direct microscope viewing without awkwardness and strain of conventional microscope eyepiece viewing. A video or data link is made from the imaging sensor to the LCD or any other type of display. The imaging sensor contains exposure settings to enable the user to increase or decrease the exposure time. A rigid tripod-like stand enables the microscope to be placed over any sample, and adjustments enable the sample to be above or below the surface of the tripod legs. Focus adjustments are available to compensate for a wide variety of samples.

The CMOS image sensor and LCD viewing screen are built into a common housing back to back where the CMOS sensor faces downward toward the sample and the LCD viewing screen faces upward toward the observer. The object or sample plane is located in the plane of the base of the tripod legs and can be adjusted for samples that are above or below the surface on which the tripod legs rest.

In one embodiment, the MICAM system incorporates a removable base-plate with a slot attachment to hold conventional microscope slides or other sample substrates.

In one embodiment, the MICAM system incorporates a miniature multi-axis positioning stage to scan and observe different regions of the sample while the tripod legs remain stationary.

In one embodiment, a compact LCD display is built into the top of the MICAM stand providing a convenient viewing screen.

An embedded micro-controller is built into an electronics accessory board for additional capability, such as storing images directly to a memory stick device in common image formats for portability to a computer or other image analysis device. The optional embedded controller operates the imaging detector, display monitor, light sources, translation stage and other features of the MICAM system.

The embedded micro-controller enables images acquired using the MICAM system to be stored on a memory stick or other compact memory storage device or be directly printed to any available printer. Printer drivers can be loaded onto the MICAM embedded micro-controller using a portable memory storage device (e.g., a USB memory stick).

A DC power adapter receptacle is located on an electronics interface enclosure mounted adjacent to one of the tripod legs (see FIG. 2). An optional battery pack (e.g., a battery pack similar to a battery pack used for video recorders) is mounted adjacent to one of tripod legs or any other type of stand that is an obvious extension of the present art.

MICAM can be used as a micro-comparator for machinists or any other engineering or biological applications. The imaging sensor can be calibrated in x and y dimensions using calibrated reticule targets. An image of the target is formed on the detector plane to determine the lateral dimensions per picture element or pixel.

The MICAM LCD viewing screen and electronics module can be removed from the tripod stand and held in the user's hand or set on a surface nearby. The imaging tube can be removed and flipped and reinstalled in order to place samples on top of the tripod stand.

The lateral positioning of the microscope objective and imaging tube is accomplished using a miniature translation stage that is either a miniature hydraulic stage for maximum stability and minimize vibration during motion, or a motor driven stage.

In another embodiment, the invention comprises removable LCD screen and electronics wire cable for image capture without disturbing the instrument or sample. Still frame digital microscope images or video sequences can be stored onto memory modules (similar to digital camera image storage devices, for example).

Another embodiment of the invention includes a stand that can take the form of a tripod, adjustable folding legs, or compact cylinder stand. The mini tripod stand is adjustable and collapsible, providing convenient method to observe samples in the field, relating to, for example, trees, crops, forensics, pathology, mineralogy, machining, and military applications.

In other embodiments of the invention, interchangeable objective lenses or lens turret have magnification of from 10× to 100×.

In other embodiments, interchangeable relay lenses comprising a compound lens that may take the form of a miniature telephoto lens are used with magnifications of 2×, 5×, or 10×.

Certain embodiments of the invention include a fine focus comprising a hydraulic translation stage, and a PZT (Lead Zirconate Titanate—Piezoelectric ceramic actuator) focusing mechanism or micrometer adjusters.

The imaging detector and LCD viewing screen can be replaced with a digital camera with specific attachments to the MICAM microscope instrument. A modified digital camera can be purchased in conjunction with MICAM, providing a conventional digital camera and digital microscope combination. The digital camera configuration provides an imaging detector and viewing screen as well as image and video capture to a memory storage device. The digital camera lens, which would be removable, and the camera both would attach to the top of the MICAM tripod stand. This feature provides reduced capability due to the small size of the LCD display and redundant camera features that do not utilize MICAM to the full potential imaging resolution. It is, however, a convenient option to have dual use of a digital camera.

An accessory base plate provides a flat surface onto which the MICAM microscope can be placed. The base plate has machined slots for standard microscope slides and other sample substrates. The accessory base consists of a multi-color light source illumination pad built into the base plate below the surface where the microscope or sample substrates rest. This provides transmitted light illumination for applications that benefit from it.

The electronics controller provides user selectable features for illumination control, color, brightness. Still images and video sequences can also be captured and stored. Detector exposure time can be adjusted with the electronics control module. The electronics controller can be interfaced to other electronic devices including a computer for more complex applications. However, no other interfaces are required and therefore MICAM is completely self-contained resulting in a powerful instrument for field use.

Focus adjustments are accomplished in three alternate approaches. The imaging tube contains a rotating sleeve that translates the imaging tube up or down by rotating the sleeve, similar in nature to the focus mechanism found in a camera lens. A more precise focus control is accomplished with a 3-axis hydraulic actuated translation stage similar in nature to a micro-manipulator used in biological cellular injection applications. The 3-axis hydraulic stage can be seen in FIG. 5. Alternatively, a piezo-electric focusing disk is incorporated into the microscope objective for precision focus control while course focus is accomplished by the rotary focus mechanism described above.

As the present invention may be embodied in several forms without departing from the spirit or essential characteristics thereof, it should also be understood that the above-described embodiments are not limited by any of the details of the foregoing description, unless otherwise specified, but rather should be construed broadly within its spirit and scope as defined in the appended claims, and therefore all changes and modifications that fall within the metes and bounds of the claims, or equivalence of such metes and bounds are therefore intended to be embraced by the appended claims.

The invention claimed is:

1. An integrated portable microscope comprising:
    (a) a tripod stand comprising adjustable legs and affixed to a positioning stage;
    (b) a visual display component affixed to the positioning stage;
    (c) an imaging detector component electrically connected to the visual display;
    (d) an imaging lens and an objective lens both of which are housed within an imaging tube having two ends, one end of which is affixed to the positioning stage and oriented transverse thereto, and the other end of which is directed toward a sample to be viewed;
    (e) at least one illumination source, wherein the illumination source is affixed to the imaging tube between the imaging detector and the imaging lens and oriented such that the light is directed toward the imaging lens at an oblique angle; and
    (f) at least one imaging module threaded into the imaging tube and attached to a mating threaded flange affixed to the tripod stand,
    wherein the imaging module enables dark field, bright field, phase contrast and fluorescence imaging, and
    wherein the portable microscope is used for in-situ observation of a specimen.

2. The portable microscope of claim 1, wherein the imaging detector component is a CCD or a CMOS imaging detector.

3. The portable microscope of claim 1, wherein the visual display component is an LCD visual display.

4. The portable microscope of claim 1, wherein the objective lens has a magnification of from 10× to 100×.

5. The portable microscope of claim 1, wherein the imaging lens has a magnification of from 2× to 10×.

6. The portable microscope of claim 1, wherein the compound magnification of the imaging and objective lens is greater than 500×.

7. The portable microscope of claim 1, wherein the objective lens is interchangeable.

8. The portable microscope of claim 1, wherein the imaging module comprises an imaging detector, an imaging lens, a beam splitter/recombination optic, an interchangeable objective lens, a specimen surface/sample holder, a selectable light source, a light source collimating lens, an iris diaphragm, and a filter.

9. The portable microscope of claim 1, wherein the illumination source is selected from the group consisting of an LED, a UV LED, a White Light LED, a narrow band LED, a laser diode, any white light source, a mercury lamp, and a xenon lamp.

10. The portable microscope of claim 1, wherein the illumination source comprises a ring of alternating color LED lamps located along the imaging tube.

11. The portable microscope of claim 1, wherein the illumination source comprises a ring of surface mounted LED chips alternating in color around a ring.

12. The portable microscope of claim 11, wherein the LED chips alternating in color are of ultraviolet, blue, green, red and white light.

13. The portable microscope of claim 1, wherein the illumination source comprises a beam splitter cube to enable fluorescence, bright field or dark field imaging.

14. The portable microscope of claim 1, wherein the illumination source is an illumination disk located underneath the sample.

15. The portable microscope of claim 14, wherein the illumination disk comprises a two-dimensional array of alternating color LED's.

16. The portable microscope of claim 14, wherein the illumination disk comprises an LCD screen.

17. The portable microscope of claim 1, wherein the visual display further comprises a digital camera.

18. The portable microscope of claim 1, wherein the visual display comprises a fused fiber bundle taper.

19. The portable microscope of claim 1, further comprising a micro-controller electrically connected to the visual display.

20. The portable microscope of claim 1, wherein the positioning stage can pivot on at least two axes.

21. The portable microscope of claim 1, further comprising a means of adjusting the focus of the image.

22. The portable microscope of claim 1, further comprising a removable base plate.

23. The portable microscope of claim 22, wherein the base plate further comprises a slot to hold a substrate.

24. The portable microscope of claim 1 comprising four or more illumination sources.

* * * * *